United States Patent

Slaven

[11] Patent Number: 5,900,300
[45] Date of Patent: May 4, 1999

[54] HIGH MODULUS AND STIFFNESS POLYMER FOAM/GMT COMPOSITES

[76] Inventor: John P. Slaven, 20942 Fleetwood, Harper Woods, Mich. 48225

[21] Appl. No.: 08/886,947

[22] Filed: Jul. 2, 1997

[51] Int. Cl.[6] .................................................. B32B 5/22
[52] U.S. Cl. ........................... 428/71; 428/157; 428/171; 428/300.7; 428/317.1; 428/319.7
[58] Field of Search ................................. 428/71, 297.4, 428/300.7, 317.1, 319.7, 157, 171

[56] References Cited

U.S. PATENT DOCUMENTS

| | | | |
|---|---|---|---|
| 3,635,483 | 1/1972 | Barriball et al. | 280/11.13 L |
| 4,078,348 | 3/1978 | Rothman | 52/309.7 |
| 4,849,277 | 7/1989 | Jaklofsky | 428/139 |
| 5,122,398 | 6/1992 | Seiler et al. | 428/31 |

*Primary Examiner*—James J. Bell
*Assistant Examiner*—Blaine R. Copenheaver
*Attorney, Agent, or Firm*—Brooks & Kushman P.C.

[57] ABSTRACT

A process for preparing GMT/foam composites in an integral process without the prior preparation of a separate consolidated GMT part produces lightweight load-bearing structures suitable for use as vehicle components such as load floors, seatbacks, and the like. The structures have fully GMT-encapsulated foam cores abutting at least partially consolidated GMT layers and at least one fully densified GMT portion. The structures may be economically and rapidly molded without resort to necessary adhesives for assembly.

15 Claims, 2 Drawing Sheets

HIGH MODULUS AND STIFFNESS POLYMER FOAM/GMT COMPOSITES

TECHNICAL FIELD

The present invention pertains to high modulus, high stiffness composites suitable for use in the transportation industries as load bearing floor structures, seatbacks, and the like. These composites comprise a semi-flexible or rigid but non-friable polymer foam substrate having appreciable areal dimensions, which is fully encapsulated by glass mat reinforced thermoplastic material (GMT). The subject invention also pertains to a process for the preparation of unique composite structures.

BACKGROUND OF THE INVENTION

In many industries, particularly in the aircraft and transportation industries, there is considerable impetus for the reduction of weight of vehicle components. In many cases, for example, these reductions in weight are necessary to achieve designated fuel economy standards which are becoming ever more stringent. Thus, it has become common within the automotive sector as well as in other transportation industries, to consider alternative designs of many vehicle components, even when the alternative designs incur a cost penalty, if the resulting parts can achieve significant weight savings.

There are many parts for which weight savings are desired. For example, in the automotive industry load floors and seatbacks are but two of such items. Load floors are essentially planar structures of fairly large areal dimensions which are placed over cargo holds, spare tire recesses, and the like. Since these floors must not overly flex upon the addition of a cargo load to the vehicle, or by the presence of vehicle occupants over this area, these floors must have appreciable stiffness. However, current floors, in order to achieve this required stiffness, are made of relatively thick section, dense materials which do not lend themselves to weight savings. Likewise, in the case of seatbacks, the relatively large buckets that surround many seats would desirably be produced in lighter weight versions without losing their structural capabilities. In the non-automotive industries, articles such as molded seats, garage doors, and the like are also amenable to use of lightweight, yet strong and highly stiff materials.

In the past, when high stiffness, high modulus materials have been utilized, they have often been prepared from substrates such as aluminum or thermoplastic honeycomb materials onto which aluminum or fiber-reinforced thermosetting skins are applied. These materials have particularly high stiffness and modulus, but their cost is prohibitive due to the very high cost of honeycomb materials. Moreover, such materials do not lend themselves to the attachment of fasteners, hinges, and other hardware items; nor are they easily formable to other than strictly planar shapes.

In similar fashion, a variety of structures have been produced from polymer foam by first forming a foam structure, and then adhesively bonding either thermoplastic, metal, or thermosetting fiber reinforced skins onto the foam core. These processes are deficient in several aspects. First, because of the relatively long curing time of the adhesives, as well as fiber reinforced thermoset materials, production time is relatively long and therefore expensive. Second, because the polymer foam core is not completely encapsulated, it is subject to shear stress under bending which may result in premature failure unless the skins are made of great thickness in order to mitigate the bending stress. However, making the skins thicker, and therefore stronger, increases both the product cost as well as the product weight.

Glass mat reinforced thermoplastic materials (GMT) have been in use for several years now. These materials are manufactured by laying down numerous strands of glass fibers into a planar array, and needling these fibers with a needle board containing numerous barbed needles. The needling operation causes the fibers to intertwine, to break, and to assume a more random distribution. The mats thus produced have the appearance of a deep pile velvet material having a thickness of from about 3 or 10 mm. These needled glass fiber mats are then impregnated with a thermoplastic in a continuous double band press. The impregnation is done at such a pressure that a lofty (low density and unconsolidated) material is produced. This lofty GMT "intermediate" product may then be laid up into a shape suitable for thermoforming. The layup may contain from one to ten or more layers of GMT material. The GMT material is generally heated prior to placement into a mold, although heated molds may be occasionally used. The material is then fully densified under high pressure to form a very stiff, high modulus, fiber reinforced product.

Most common GMT materials are rather isotropic in nature, having been derived from randomly deposited fiber strands which are then intensively needled. However, if isotropic materials having enhanced strength in a given direction are required, strands of unidirectional glass fibers may be introduced on top of the randomly laid down strands, or alternatively, the strands may be laid down in elliptical rather than circular patterns. The higher proportion of fibers in one direction produces anisotropic or "unidirectional" GMT. Such composite materials have been utilized in a wide variety of relatively low cost, but dense and therefore relatively heavy load bearing structures.

For example, U.S. Pat. No. 5,122,398, discloses an energy absorbing bumper beam composed of a first, load bearing bumper support section which is designed to be attached to the vehicle frame, a core of expanded polyolefin thermoplastic foam for energy absorption characteristics, and an outer covering shell of another polymer. However, in the production of such bumper materials, it is necessary to form the three portions of the composite as separate components, and then bond them together adhesively. Thus, although the expanded polyolefin absorbing substrate is fully encapsulated, it is not fully encapsulated by a load-bearing GMT material, nor is it integrally encapsulated, i.e. encapsulated at the same time that the GMT material is molded. Rather, it is separately molded and adhesively bonded. The separate molding and adhesive bonding steps add additional cost and expense to the preparation of such bumper materials. As the covering layer is not fiber-reinforced, it has little tensile or compressive strength. The composite is not therefore sufficiently resistant to bending (shear) stress.

It would be desirable to be able to produce high modulus, high stiffness components having significant areal dimensions, yet having low weight. It would be further desirable to produce such components from readily available raw materials in a cost effective manner.

SUMMARY OF THE INVENTION

It has now been unexpectedly discovered that high stiffness, high modulus load bearing structures of appreciable areal dimensions may be made by fully encapsulating a semi-flexible or rigid but nonfriable polymeric foam core with GMT material, and consolidating the same to form a product having a fully densified outer periphery, and in general a less fully densified GMT skin over the polymeric foam core. The composite materials of the present invention are well suited to rapid mass manufacturing techniques, use relatively inexpensive materials, do not require setting times for adhesive bonding, and produce structures which are capable of enormous weight savings. For example, in one application, a load floor made of traditional pressed wood fibers weighing fourteen pounds has been replaced by a load floor having much greater stiffness and yet having a weight of only seven pounds, a 50 percent reduction in weight.

DESCRIPTION OF THE PREFERRED EMBODIMENTS

Figure 1:
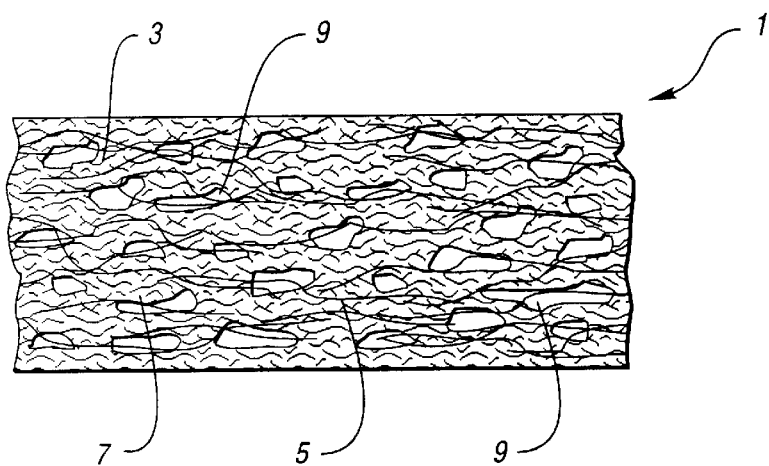
FIG. 1 illustrates an unconsolidated, lofty GMT material.

GMT material is by now well known. As explained previously, this material is produced by laying down a random, oriented, or combination of random and oriented array of glass fiber strands, following which the glass fibers of the strands are intensively needled by means a needle board containing a matrix of barbed needles to break and intermingle the fibers. The product contains numerous broken fibers, but also contains a variety of fiber lengths which give the product a considerable amount of strength. The directionality of the fibers prior to needling is responsible to a large degree to the directionality or non-directionality (anisotropic or isotropic) nature of the GMT material.

Following preparation of the needled mat, the mat is then impregnated with a thermoplastic material in a double band press. Although the thermoplastic material can be a high strength material such as liquid crystalline polyester, aramid, polysulfone, polyethersulfone, or the like, the vast majority of the GMT material produced today contains a relatively low melting, low modulus thermoplastic such as polyethylene, polypropylene, or other polyolefin homo- or copolymers. The latter polymers are used primarily due to their lower cost, yet still produce products with entirely acceptable performance in many applications. In like fashion, although it is less desired from an economic standpoint, the glass fibers of the GMT material may be replaced in whole or in part by carbon fibers or other high strength fibers and similarly needled to form yet higher modulus products. The manufacture and use of such products is now well known skilled in the art and many such products are commercially available, for example from Azdel, Inc., BASF A.G., and Symalit A.G. Representative of the patents directed to processes of preparation and use of GMT material are U.S. Pat. Nos. 4,692,375, 4,802,843, and 5,580,646, which are herein incorporated by reference.

The foam core substrate is preferably one of expanded polyolefin (EPO), more particularly expanded polypropylene (EPP). Expanded polyolefin is generally supplied in the form of expandable beads which are then placed into a suitable mold and heated by hot air or steam, whereby they expand and the cell walls fuse. The resulting products have a high degree of strength as well as a high capacity for energy absorption. The foams may be molded in flat sheets; large blocks which are then sliced, if necessary, to form sheet material or material of other shapes; or the beads may be molded into a substantially net shape product of complex form. The preparation and use of expandable polyolefins is disclosed in U.S. Pat. Nos. 4,676,939; 4,769,393; 5,071,883; 5,459,169; 5,468,781; and 5,496,864, which are herein incorporated by reference.

The use of EPO or EPP products as the substrate, or core of the subject invention composites is highly preferable, as this combination, together with the use of polypropylene impregnated GMT material, results in a totally recyclable product. Total recycle of automotive components is becoming increasingly important, and is necessary in Europe where cradle to grave environmental legislation exists.

While the preferred foam substrates are EPO, the subject invention is not limited thereto. Other foams are highly suitable for use in the subject invention, provided they are sufficiently strong to resist the compression loading which occurs during the molding operation, and may be fused to the polymer impregnant of the GMT skin. Examples of suitable foam are extruded and bead-type polystyrene foam, polyvinylchloride foam, and polyurethane foam. In the case of polyurethane foam, the polyurethane foam should be a semi-flexible foam or rigid foam which is non-friable. Such foams are produced, as is well known to those skilled in the art, from polyol components having substantial quantities of di- and trifunctional polyols as opposed to rigid insulation foams which are prepared from essentially all higher-functional polyols, and which generally employ excess isocyanate in conjunction with trimerization catalysts to form isocyanurate linkages. The polyurethane foams will in general be softenable by heat, i.e. such that they may sufficiently bond to the polypropylene or other GMT matrix polymer. Reference may be had to *POLYURETHANES: CHEMISTRY AND TECHNOLOGY*, Saunders and Frisch, John Wiley & Sons, N.Y.

Syntactic foams may also be used. Such foams are prepared by admixing polymeric or inorganic microballoons with a suitable polymer matrix resin and hardening into shape. These syntactic foams may be supplied in sheet form, block, or in net shaped products. Examples of microballoons which are commonly used are phenolic microballoons and glass microballoons. Such products are well known to those skilled in the art, and due to their polymer matrix, are still considered "polymer foams" as that term is used herein.

In the preparation of composite materials from GMT, past practice has been to fully consolidate the GMT material. Full consolidation requires a considerable amount of pressure, i.e. in excess of 800 psi, and commonly in the range of 1000 psi to 2000 psi. The GMT material may be consolidated in a hot mold, but preferably, the GMT material is heated to above the fusion temperature of the polypropylene or other thermoplastic impregnant, the sheets are laid into a cold mold, the mold is closed, and the GMT material consolidated under high pressure. The result of this high pressure consolidation is considerable flow of the many broken fibers and complete melding of the thermoplastic impregnant, resulting in the production of a material which is essentially "integral", or "unitary", and which does not exhibit signs of delamination. Full consolidation results in a fully dense material which consists primarily of polypropylene having imbedded glass or other reinforcing fibers distributed therein. There are essentially no voids in the fully consolidated product.

Because the full consolidation of GMT material requires such high pressure, i.e. 1000–2000 psi, it has been considered impractical to even attempt to consolidate GMT material around a polymeric foam core. The foam materials, although having relatively high modulus, have low compressive strength. Such materials would be destroyed during consolidation. Thus, prior products employing GMT and foam core materials have required the GMT structural shell to be prepared in a separate operation, following which the fully consolidated shell is bonded to the polyolefin. As discussed previously, these additional steps increase the cost of the product as well as providing for an inferior product. In such products maximum shear strength cannot be obtained due to the possibility of shear induced movement and fracture of the polymeric core.

The present inventors have discovered that a fully encapsulated product can be produced from a polymeric foam core without the separate formation of consolidated GMT shells, by laying up at least a first and a second GMT layer in a mold, between which is positioned the polymeric foam substrate. The mold is gapped over the region containing the polymeric foam substrate, so as to produce a highly reduced pressure over the foam. As a result of the reduced pressure, fracture of the foam due to the pressure exceeding its compressive strength is avoided, yet the pressure is sufficient to at least partially consolidate the GMT material. At the surrounds of the foam core substrate, however, the pressure is much higher, preferably equal to traditional GMT consolidation pressures, and the GMT material is fully consolidated and thus fully densified over these portions, resulting in a high strength fiber-reinforced, polymer matrix surround.

It has been surprisingly discovered that highly stiff, high modulus materials comprising GMT skins over a polymeric core may be made without full consolidation of GMT over the foam itself when the foam is fully encapsulated. Under these conditions, the fibers in the GMT coverings (skins) which sandwich the foam substrate absorb most of the bending stress through compression or tension of the glass fibers, and do not require a fully dense polymer matrix. While it may be perhaps preferable to fully densify the GMT material which lies on both sides of the polymeric foam substrate, this has not been found to be necessary, and indeed is impractical with most if not all existing polymeric foams. Consolidation pressure must be below the compressive strength of the foam, otherwise foam failure will result.

The GMT substrate which lies above the foam may consist of one or more layers of GMT material. Traditional GMT material is sold in thicknesses of approximately 8 to 10 mm, which produces a thickness of approximately 3 mm when fully consolidated. Applicants have surprisingly found that in the production of materials in accordance with their invention, that yet thinner GMT layers are feasible, due to the high modulus of the core. Thus, the skin thickness over the core may be reduced, reducing both part weight and cost. An unconsolidated thickness of c.a. 1.5–3 mm has proven quite desirable.

The thickness, and thus also the number of GMT layers in the fully encapsulating surround or other structural portions of the composites of the subject invention may be tailored for the particular application. Thus, it is quite conceivable that layers of up to 3 to 4 cm in thickness, more commonly 1 to 2 cm in thickness may be necessary in certain portions of designs where high structural loads are expected in these areas. This is true for example in seatback products, where the more or less planar back, i.e. a back having substantial areal dimensions, is not expected to encounter large forces along this areal dimension, but other points must accept high loads. Thus, the skin atop the portion of the foam substrate having appreciable areal dimensions may be made relatively thin. However, other portions of the seatback, i.e. the side frame, or points where hardware may be attached, should be relatively thick and fully densified GMT material. In other instances, e.g. load floors, only two GMT layers may be quite suitable in the surround.

Because GMT material flows under pressure, it is necessary to produce a mold where the flow of material from the high pressure region of the mold (where full consolidation is necessary) into the lower pressure portion of the mold (where partial densification is allowable and where it is important that the pressure not exceed the compressive strength of the foam), is restricted. Flow of thermoplastic and fibers from the region of full densification and high pressure may be prevented by the presence of a labyrinth "seal" of reduced dimensions, for example, one of an "S" shape, such that the fiber and polymer must take a tortuous path of high resistance in order to enter the reduced pressure zone. This is best illustrated with respect to FIG. 4a.

The mold, in general may not simply be necked down to provide a very narrow passage, as the resulting molded product would be very thin at the portion corresponding to the restriction, and will thus be quite weak due to the necessity of providing a very limited flow path to prevent the unwanted flow of GMT material. The use of a tortuous path and only slightly reduced section allows retention of section and strength while preventing ingress of flowable GMT material into the foam-containing portion of the mold.

Figure 2:
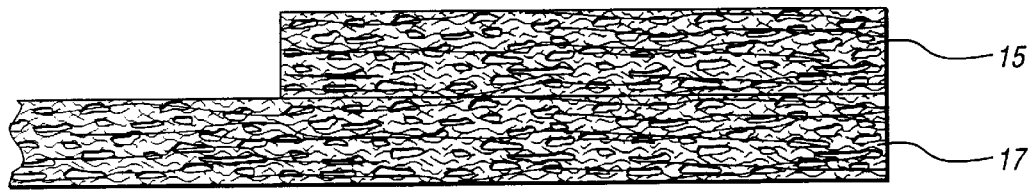
FIG. 2 illustrates a side view of a GMT layup having a portion containing two layers of unconsolidated GMT material, with the remainder having but one layer of unconsolidated GMT material.

The invention may be further described in relation to the drawings. FIG. 1 illustrates a layer of unconsolidated GMT material 1 viewed from the side. The material 1 is lofty and of relatively low density, containing numerous broken and intertwined glass fibers 3 as well as some longer glass fibers 5, all associated with a polypropylene or other polymer 7. Numerous voids 9 are evident. FIG. 2 illustrates a two-ply layup of unconsolidated GMT material consisting of two plies (15,17), with one layer, 17, extending beyond the others.

Figure 3:
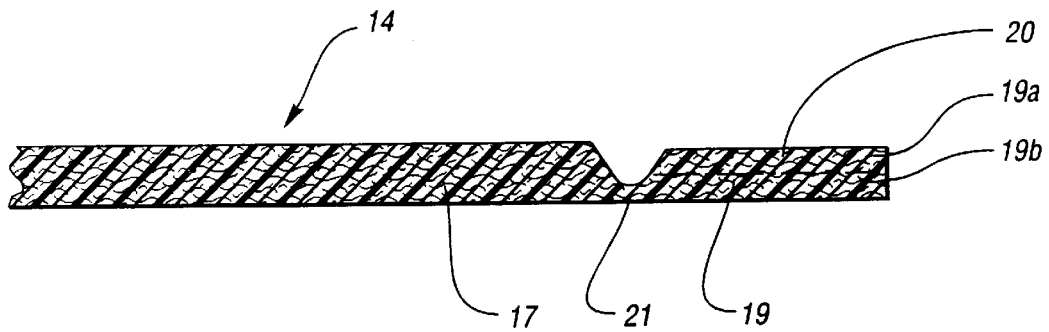
FIG. 3 illustrates a processed layup such as that of FIG. 2, which has been partially consolidated in the portion containing the single GMT layer, contiguous with a section made of two fully consolidated layers.

FIG. 3 illustrates a part 14, a portion 17 of which constitute a partially consolidated GMT material, while a further portion 19 comprises two layers of fully consolidated GMT materials 19a and 19b. Although the partially consolidated layer appears to be "solid" macroscopically, upon higher magnification, numerous voids continue to exist. The material has considerable strength, but is not fully dense. Dotted line 20 indicates the pre-consolidation boundaries of the two GMT layers of portion 19. At 21 is a portion of reduced section designed to impede flow of glass fibers and polymer from the area in the mold of higher pressure used to consolidate portion 19 to the area of lesser pressure to partially consolidate portion 17. The reduced section 21 is not optimal as its thickness precludes high strength from being obtained in this area, although this reduced strength may be acceptable for numerous applications.

Figure 4:
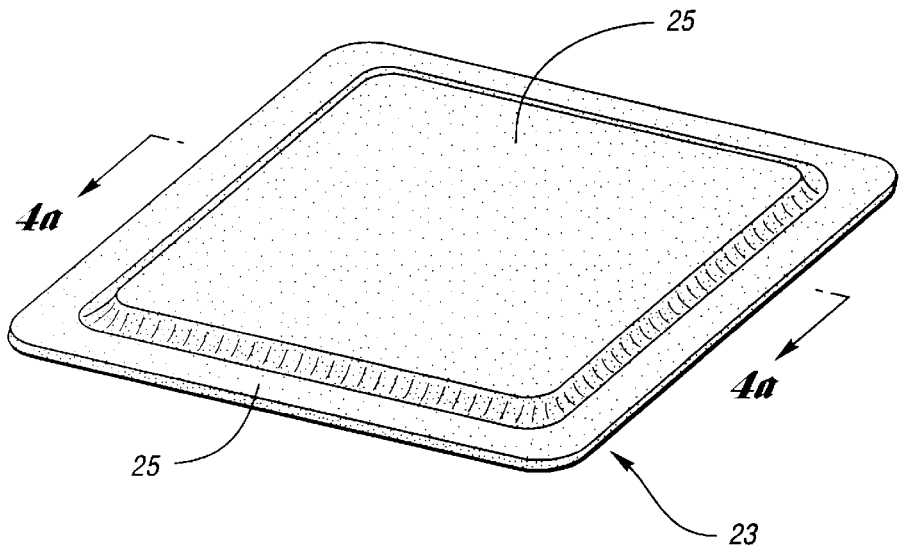
FIG. 4 illustrates a load floor according to one embodiment of the subject invention.

FIG. 4 illustrates one embodiment of a fully encapsulated load floor 23. At 25, the surround is fully consolidated, having been constructed of four or more plies of GMT material which has been fully densified. At 25 is a raised portion having but one ply of partially consolidated GMT material which surrounds a polyolefin foam core. Further details may be illustrated by viewing a section of the load floor and the mold used to form the load floor of FIG. 4, the section corresponding to a section of the load floor 23 across 4a–4a.

Figure 4A:
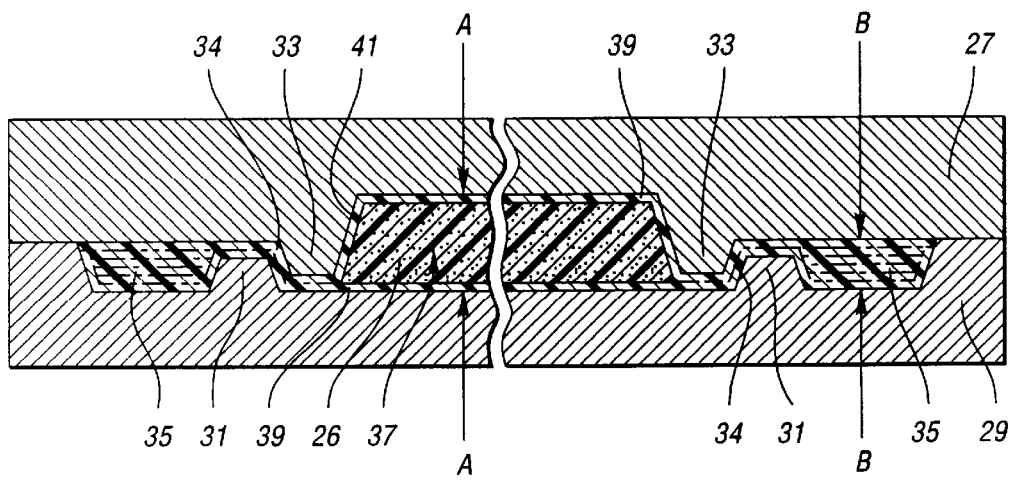
FIG. 4a illustrates a cross-section of a mold suitable for use in one aspect of the subject invention process with a part similar to that disclosed in FIG. 4 located therein.

In FIG. 4a, the mold consists of two halves 27 and 29. The outer surround of the load floor 23 is molded in cavities 35 of the mold, which are dimensioned along B—B so as to provide a cavity substantially having the depth of four fully consolidated GMT plies. For example, with four plies having an unconsolidated thickness of 10 mm each, and each having a fully consolidated thickness of 2.5 mm, this cavity depth would be approximately 10 mm. During consolidation, these cavities will be under high pressure, e.g. 1000 psi to 2000 psi. Extensions 33 and 31 of the upper and lower mold halves together form an "S",-shaped labyrinth seal 34 of somewhat reduced section, into which some GMT material will flow from cavities 35 during molding, but which severely limit flow such that cavities 35 may be maintained at the necessary consolidation pressure.

A second mold cavity 37 corresponds in shape to the raised portion 25 of the load floor. In cavity 37, foam core 26 is located, on the top and bottom of which are single layers 39 of GMT material. The mold is gapped in this area; i.e., the depth B—B of cavity 37 is such that full consolidation pressure is not applied to GMT layers 39 nor foam core 26. For example, with a 25 mm thick polyolefin foam core and two GMT skins of 10 mm thickness, as described above for the surround, the depth B—B of cavity 37 may be about 33 mm. Thus, the GMT skins will only be consolidated to about 4 mm thickness rather than their fully densified 2.5 mm thickness. The pressure in this portion of the tool will be far less than at the edges, for example 60 to 200 psi, and generally in the range of 100 psi. The gap is adjusted to provide the desired degree of GMT consolidation without exceeding the crush strength of the foam. The side walls 41 of the raised section 25 of the load floor advantageously are sloped rather than at a right angle to the plane of the floor to facilitate GMT consolidation in this area.

By the term "partially consolidated" is meant a degree of consolidation which is less than full consolidation, i.e. fully densified material containing substantially no voids. By "fully consolidated" as used in the claims, is meant a material which is more fully consolidated than the "partially consolidated" material abutting the foam core. In general, this fully consolidated material is fully densified, i.e. the maximum consolidated density has been achieved. Maximum consolidation will provide maximum strength. However, it would not depart from the spirit of the invention to use a less than optimal strength material by not fully consolidating the "fully consolidated" material. If the GMT material has been consolidated to a higher degree than the partially consolidated material surrounding the foam, then this degree of consolidation is still considered to be fully consolidated.

Although adhesives are generally preferred to be avoided, it would not depart from the spirit of the invention to include a rapidly curing thermoset adhesive or a thermoplastic adhesive, for example a film adhesive, particularly when the respective polymers of the foam core and GMT material are not fully compatible, i.e. a strong bond cannot be readily made. In this case, in particular, commercial film adhesives or hot melt adhesives may be applied between the foam and the unconsolidated GMT facing layers.

By the term "flow restricting means" is meant a means for reducing the flow of GMT material from areas of high consolidation into foam receiving cavities. Preferably, this means comprises a portion of reduced section, more preferably an only somewhat reduced section presenting a tortuous path. However, other equivalent means may be used as well so long as the desired results, i.e. pressure differential and only limited flow of GMT material results. For example, particularly when polypropylene impregnated GMT and expandable polypropylene foam are used, a polypropylene "dam" may be inserted in the communication channel between the respective cavities. This dam may be cold or only partially heated so as to retain its shape and flow-restricting function, yet meld with the molten GMT polymer to produce a unitary structure. The dam may also contain reinforcing fibers, or be prepared of different polymer than the GMT matrix polymer.

Thus, a process is provided for the preparation of a fully encapsulated composite structure. The process includes a polymer foam core and at least a portion of fully consolidated GMT material. The foam core is surrounded by GMT material. The process includes providing a gapped mold having at least one polymer foam-receiving cavity, the dimensions of the foam-receiving cavity being such so as to at least partially consolidate layers of unconsolidated GMT material abutting at least two sides of the foam core when the gapped mold is closed. At least one GMT-receiving cavity is provided, the dimensions of the GMT-receiving cavity being such so as to consolidate unconsolidated GMT material placed in the cavity to a greater extent than the GMT material abutting the at least two sides of the foam core when the mold is closed. The GMT receiving cavity and the polymeric foam-receiving cavity are in communication with each other. At least a first layer of unconsolidated GMT material is placed in the mold, at least one foam core is placed in each of the at least one foam-receiving cavities superficial to the at least one first unconsolidated GMT layer, and at least a second unconsolidated GMT layer is placed superficial to the at least one foam core. The mold is closed to exert pressure so as to consolidate the GMT layers to form at least one GMT portion which has been fully consolidated, and portions abutting the foam core which have been partially consolidated. The at least one polymeric foam core is fully encapsulated by GMT material.

The subject process and the products prepared thereby have numerous advantages. First, the products may be prepared from relatively inexpensive, readily available raw materials. Second, because of the unique fully encapsulated structure and its both fully densified as well as partially densified product portions, maximum advantage is taken of material physical properties. Third, the total encapsulation results in a heightened ability of the foam interior to resist shear and bending stress. Finally, with respect to the product, when compatible materials, i.e. polypropylene impregnated GMT and polypropylene foam, are used, the products may be fully recycled.

With respect to the process, because only limited portions of the composite need be subjected to full consolidation pressure, i.e. the fully consolidated surround of a load floor, while the remainder is molded at relatively low pressure, molding machines of much lesser tonnage may be used. For example, a 700 ton machine may be used to prepare a relatively large load floor, whereas full GMT consolidation of a part having the same areal dimensions would require a much larger machine, for example a 1400 ton machine. Larger machines are much more expensive as well as requiring more floor space.

Having now fully described the invention, it will be apparent to one of ordinary skill in the art that many changes and modifications can be made thereto without departing from the spirit or scope of the invention as set forth herein.

What is claimed is:

1. An integrally molded, fully encapsulated GMT/polymer foam composite structure, comprising:
   at least one portion of fully consolidated GMT material;
   at least one portion of GMT material consolidated to a lesser degree than said fully consolidated GMT material;
   said at least one polymeric foam core fully encapsulated by GMT material, at least a portion of said GMT material encapsulating said foam core being not fully consolidated.

2. The composite structure of claim 1 wherein said at least one polymer foam core is substantially planar, having two major surfaces, said two major surfaces each abutting a layer of only partially consolidated GMT material, said partially consolidated GMT material consolidated to a lesser degree than said at least one portion of fully consolidated GMT material.

3. The composite structure of claim 2 comprising a planar foam core having a top surface and a bottom surface, said planar foam core having three or more edge surfaces; said top and bottom surfaces each respectively abutting an only partially consolidated GMT material; at least one of said edge surfaces adjacent a fully consolidated GMT portion.

4. The composite structure of claim 3 wherein said foam core is substantially rectilinear, each of said edge surfaces of said foam core adjacent fully consolidated GMT material.

5. The composite structure of claim 4 which comprises a vehicle load floor.

6. The composite structure of claim 1 wherein between a fully consolidated GMT portion and an only partially consolidated GMT portion is a portion of GMT material of lesser thickness than said fully consolidated GMT portion.

7. The composite structure of claim 6 which comprises a vehicle load floor.

8. The composite structure of claim 1 wherein an interface between said at least one foam core and said abutting only partially consolidated GMT layer is devoid of a separately applied adhesive.

9. The composite structure of claim 1 wherein an adhesive layer is located mediate said foam core and at least one of said abutting only partially consolidated GMT layers.

10. The composite structure of claim 1 which comprises a vehicle load floor.

11. The composite structure of claim 1 which comprises a seatback.

12. The composite structure of claim 1, wherein said foam core comprises expanded polyolefin.

13. The composite structure of claim 1, wherein said only partially consolidated GMT material, prior to its partial consolidation, has a thickness of from about 1.5 mm to about 3 mm.

14. The composite structure of claim 1, wherein the thickness of said only partially consolidated GMT material is about 1.6 times to about 3.3 times of the thickness of the same GMT material fully consolidated.

15. The composite structure of claim 1 which is a vehicle load floor comprising a planar foam core, said foam core abutting an only partially consolidated GMT layer on a first face and abutting an only partially consolidated GMT layer on a second face parallel to said first face, said partially consolidated GMT layers meeting only around the periphery of said load floor, and being fully consolidated around said periphery.

* * * * *